(12) United States Patent
Backhouse

(10) Patent No.: US 8,448,163 B2
(45) Date of Patent: May 21, 2013

(54) DEPLOYING J2EE WEB APPLICATIONS IN AN OSGI ENVIRONMENT

(75) Inventor: Richard Andrew Backhouse, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1627 days.

(21) Appl. No.: 11/464,543

(22) Filed: Aug. 15, 2006

(65) Prior Publication Data

US 2008/0046882 A1 Feb. 21, 2008

(51) Int. Cl.
*G06F 9/445* (2006.01)

(52) U.S. Cl.
USPC .......................... 717/174; 717/171; 717/177

(58) Field of Classification Search
None
See application file for complete search history.

(56) References Cited

U.S. PATENT DOCUMENTS

| | | | |
|---|---|---|---|
| 6,925,471 B2 | 8/2005 | Bodin et al. | |
| 7,191,232 B2 * | 3/2007 | Rigori et al. | 709/226 |
| 7,640,542 B2 * | 12/2009 | Herenyi et al. | 717/177 |
| 7,647,392 B2 * | 1/2010 | Sharma et al. | 717/171 |
| 8,225,310 B1 * | 7/2012 | Robertson et al. | 717/174 |
| 8,225,311 B1 * | 7/2012 | Robertson et al. | 717/174 |
| 2003/0191823 A1 * | 10/2003 | Bansal et al. | 709/220 |
| 2004/0111699 A1 * | 6/2004 | Rockwell | 717/171 |
| 2004/0111709 A1 * | 6/2004 | Furst et al. | 717/171 |
| 2004/0194059 A1 * | 9/2004 | Akella et al. | 717/118 |
| 2005/0154785 A1 | 7/2005 | Reed et al. | |
| 2005/0193388 A1 * | 9/2005 | Hayes, Jr. | 717/174 |
| 2005/0223101 A1 | 10/2005 | Hayes, Jr. | |
| 2006/0140144 A1 * | 6/2006 | Bruner et al. | 370/328 |
| 2007/0283344 A1 * | 12/2007 | Apte et al. | 717/174 |
| 2009/0276769 A1 * | 11/2009 | Brannen et al. | 717/174 |
| 2009/0276770 A1 * | 11/2009 | Taieb et al. | 717/177 |
| 2009/0282400 A1 * | 11/2009 | Jung et al. | 717/174 |
| 2010/0017797 A1 * | 1/2010 | Hwang | 717/174 |
| 2010/0138825 A1 * | 6/2010 | Harrop | 717/174 |
| 2011/0061048 A1 * | 3/2011 | Katoh | 717/177 |

OTHER PUBLICATIONS

Jose Ruiz et al., A Framework for Resolution of Deployment Dependencies in Java-Enabled Service Gateways, Mar. 9, 2004, Springer Berlin/Heidelberg, vol. 2952/2004, pp. 1-11.*

(Continued)

*Primary Examiner* — Thuy Dao
*Assistant Examiner* — Hanh T Bui
(74) *Attorney, Agent, or Firm* — Steven Greenberg, Esq.; Carey, Rodriguez, Greenberg & O'Keefe

(57) ABSTRACT

Web applications are deployed for execution within the existing framework of Open Services Gateway initiative (OSGi) when they are written in the commonly-employed Java™ (trademark of Sun Microsystems, Inc) 2 Platform, Enterprise Edition (J2EE) language. The intended deployment of J2EE web applications is detected and the J2EE application contents are converted into appropriate OSGi bundles using a provisioner. The provisioner employs its list of available provision providers to create the OSGi bundles that correspond to the J2EE application contents.

13 Claims, 2 Drawing Sheets

OTHER PUBLICATIONS

Francois Exertier, J2EE Deployment: The JOnAS Case Study [online], Nov. 17, 2004 [retrieved on Jun. 17, 2010], arXiv.org, pp. 27-36. Retrieved from the Internet: <URL: http://arxiv.org/ftp/cs/papers/0411/0411054.pdf>.*

Richard S. Hall et al.; OSGi in Action; 2009; [retrieved online on Jan. 3, 2013]; pp. 1-24; Retrieved from the Internet: <URL: http://www.manning.com/hall/Hall_MEAP_O1.pdf>.*

Youn-Gab Kim et al.; Service Bundle Authentication Mechanism in the OSGi Service Platform; 2004; [retrieved online on Jan. 3, 2013]; pp. 1-6; Retrieved from the Internet: <URL: http://ieeexplore.ieee.org/stamp/stamp.jsp?tp=&arnumber=1283946>.*

Takoua Abdellatif et al.; J2EE packaging, deployment and reconfiguration using a general component model; Nov. 2005; [retrieved online on Jan. 3, 2013]; pp. 1-15; Retrieved from the Internet: <URL: http://sardes.inrialpes.fr/papers/files/05-Abdellatif-CD.pdf>.*

Kirchhof, et al, "Component-Based Development of Web-Enabled eHome Services," UMICS 2004, LNCS 3272, pp. 181-196, 2004 Springer-Verlag Berlin, Heidelberg, 2004.

Alpern, et al, "PDS: A Virtual Execution Environment for Software Deployment," VEE, 1905, Jun. 11-12, 2005, Chicago, III, pp. 175-185.

Marin, et al, "Sensor Bean: A Component Platform for Sensor-based Services," MPAC 1905, Nov. 28-Dec. 2, 2005, Grenoble, Fr. Article 12.

Duenas, et al, "An End-to-End Service Provisioning Scenario for the Residential Environment," IEEE Communications Magazine, Sep. 2005, pp. 94-100.

* cited by examiner

DEPLOYING J2EE WEB APPLICATIONS IN AN OSGI ENVIRONMENT

FIELD OF THE INVENTION

This invention relates generally to World Wide Web computer systems having application programs stored or loadable on servers or other computers for execution at the request of a client and another computer connected to and communicating with the computer having such an application over the World Wide Web. Such applications are commonly referred to as "Web Applications" because they are accessible for execution remotely by clients communicating over the web. More specifically, the invention relates to accommodating deployment of such Web Applications for execution when they are written in the commonly-employed Java™ (trademark of Sun Microsystems, Inc) 2 Platform, Enterprise Edition language referred to as "J2EE" and to be executed within the existing framework known as Open Services Gateway initiative referred to as "OSGi"

BACKGROUND OF THE INVENTION

Within the context of the OSGi environment, many Java-based services that can be remotely accessed and managed have been defined such as Log, Configuration management, Preferences, Http Service, XML parsing, Device Access, etc. However, not all services capable of being written for deployment using J2EE have been defined for the OSGi environment. Therefore, when new J2EE Applications are written and are to be deployed in such an environment, the necessary resources and facilities required by such a new web application may not be available in the OSGI environment. Therefore, some way of enabling successful provisioning for deployment for such applications must be provided. That is the central object of the present invention.

In software engineering, a "web application" is an application that is accessed with a user's web browser over a network such as the Internet or an intranet. Web applications are very popular because of the almost universal use of the web browser as a client. The ability to update and maintain the web applications without disturbing or changing the software on many thousands of client computers is a powerful reason for the popularity of web applications. Such web applications are used to implement a host of useful services and functions such as webmail, online sales, online auctions, discussion boards, weblogs, etc. In earlier types of client-server computing, each application had its own client program which served as it's user interface and which had to be separately installed on each user's personal computer. Any upgrade to the server portion of the application would typically require a corresponding upgrade to the clients installed on each user's workstation, greatly increasing the cost of support and decreasing productivity. In contrast to this, modern web applications can dynamically generate a series of web pages for display in a standard format supported by the commonly used browsers available today and typically running HTML or XHTML. Additionally, client-side scripting in standard languages such as JavaScript® (trademark of Sun Microsystems, Inc), is commonly employed to add dynamic elements to the user's interface. Generally, each web page is delivered to the client as a static document, but sequencing the pages provides an interactive experience as user input is returned over the web as form elements embedded in page markups. During a session, the web browser interprets and displays the pages and acts as a sort of universal client for any web application. Presently, Java, remains one of the most prevalent languages for writing web applications for enterprises and specifically, J2EE remains the standard for developing such applications.

As alluded to above, supporting deployment of J2EE-based web applications within an OSGi environment can be a source of difficulty because there are conflicting architectures in both OSGi and J2EE and inabilities of the OSGi environment to support the dependencies inherent in both existing and in newly-written J2EE applications for which deployment is desired. Such dependencies may not be fulfilled in the J2EE application itself and this will cause failure of deployment. The present invention provides a way to support deployment of J2EE web applications in an OSGi environment by provisioning the dependencies in any J2EE based web applications and constructing the OSGi Bundles for execution that are necessary within an OSGi environment.

SUMMARY OF THE INVENTION

Each web application that is to be deployed within an OSGi environment must have a corresponding OSGi bundle installed and started that provides the gateway to any other services that the web application relies on or needs in order to execute.

For OSGi devices such as Windows® (trademark of Microsoft, Inc.) 32 bit devices, servers or other computer devices that are generally asked to execute all or portions of web-based applications, the executable software is distributed in the form of OSGI "bundles." An OSGi bundle is comprised of Java classes and resources which, together, provide the functions of the web application to device owners or provide services and packages to other bundles. A bundle is distributed as a Java ARchive file (JAR file) containing, in a compressed form, the resources to implement zero or more services, a manifest file describing the contents of the JAR file and providing information about the bundle, dependencies on other resources such as Java packages that must be available to the bundle before it can be run, a special Java class within the bundle to act as a bundle activator, and any other optional documentation of the JAR file or one of its sub-directories required to run the bundle. All of the foregoing is well-known to programmers and may be found in a number of publicly documented sources such as the OSGi Alliance Developer's Zone.

For example, a typical web application may require a Web-container, a JSP (Java Server Page) Container and a JSF (Java Server Faces) runtime file in order to execute properly in the OSGi framework. The chief difficulty faced is how to accurately define the required set of OSGi import statements that will provide the Web Application with the various services and capabilities that its corresponding Web Application Bundle requires. The invention herein solves this problem by providing a mechanism by which any interested party such as a user at a workstation or another web application that desires to run or use the services of the Web Application itself to analyze the Web Application as it is invoked for deployment and to provide, using a provisioning service in accordance with the invention, the correct import statements to access resources, classes, configuration files and the like based upon what is found within the Web Application for which deployment is desired.

In this regard, each such web application will have defined for it an OSGi bundle having two modules for deployment: An expanded or augmented Web Application WAR (Web Application Archive file) file having a temporary area definition for holding JSP translations and a Web Application OSGi bundle containing a list or manifest that details all of the Web Application's dependency imports along with a properties file that details where to find the resources called for in the resolved and expanded WAR file together with it's temporary area for the JSP translations mentioned earlier.

BRIEF DESCRIPTION OF THE DRAWINGS

The foregoing and other objects and advantages of the invention will be appreciated more fully from the following further description thereof with reference to the accompanying drawings, wherein.

DETAILED DESCRIPTION OF ILLUSTRATIVE EMBODIMENTS

Figure 1:
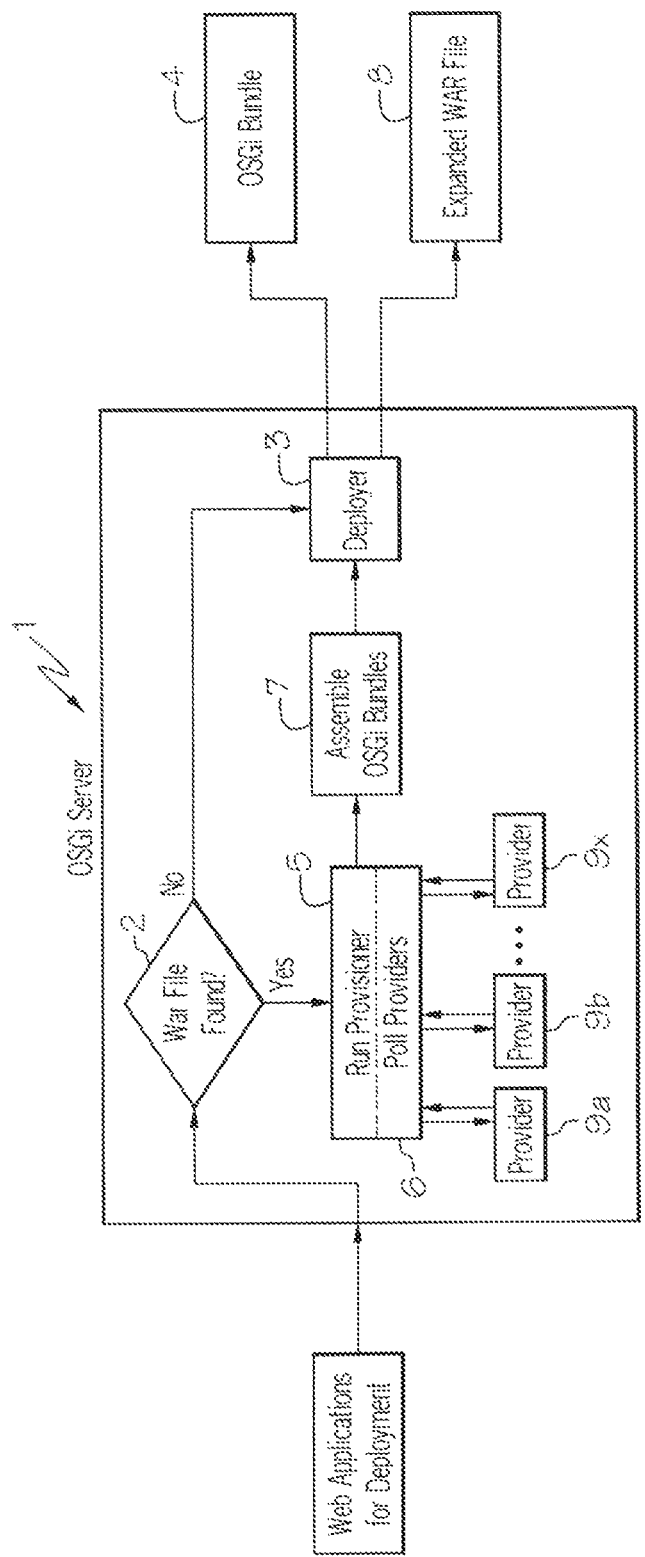
FIG. 1 illustrates schematically the system and flow of web applications in a server for which deployment and execution in the server in an OSGi environment is desired. It illustrates a preferred embodiment of the system and method of the invention for identifying J2EE web applications and the provisioning of dependencies that may be therein and the supplying of the output of the components required for deployment and execution of the J2EE web application in the OSGi environment.

The invention will now be described in detail with reference to a preferred embodiment thereof as illustrated in the Drawings mentioned above.

Turning to FIG. 1, web applications that are to be deployed in an OSGi-based server 1 are examined for the presence of an identifying characteristic of J2EE web applications in box 2. In the present instance, the presence of a WAR (Web Archive) file will be searched for in the incoming web applications bound for deployment in the server 1. If no WAR file is found, the application is assumed to be suitable for deployment and is passed directly to the deployer 3 which outputs the requisite OSGi execution bundles 4 making up the web application. However, if the presence of a WAR file is detected in box 2, the web application is passed to the provisioner mechanism 5 of the invention where the WAR file will be expanded in box 6 from its usual data-compressed state, and examined for dependencies therein on other resources or services. Then the provisioner 5, using the mechanism in box 6, polls or queries a list of available provision providers 9a-9x which individually identify dependencies which they can fulfill. The provision providers 9a-9x, in response to the poll or query from the provisioner, each return a list object containing the import statements necessary to access their resource or service in order to fulfill the identified dependency in the expanded WAR file included in the J2EE web application. When the entire list of providers has been polled, the provisioner 5 assembles the import statements into OSGi execution bundles 4 in box 7 and delivers the finished bundles 4 to the deployer 3 along with the expanded WAR file 8. The deployer 3 then outputs the OSGi execution bundles 4 and the expanded WAR file 8 for execution in the server or other computer.

As is well-known in JAVA-based programming, a WAR file is actually a file that makes up a web application including servlets, Java Server Pages (JSP) or other resources. The WAR file itself is in the same format as the well-known JAR (Java ARchive) file that is a compressed or "zipped" archive that is designed to be decompressed to a specific directory structure for execution. JAR files or WAR files may be decompressed or "unzipped" using the ubiquitous PKUNZIP utility that is very well-known and universally recognized and available. The WAR file is a single file that contains a set of other files making up the J2EE web application. Once decompressed, the WAR file is said to be "expanded" to make all of its contained files and their contents visible and accessible for use and execution in a server or other computer. Normally, the decompression is done when a WAR file is deployed to an application server where it is more efficient to deal with the individual files themselves instead of having to expand the WAR file in the server's memory every time access thereto is necessary. WAR files may also contain still other WAR files as well, so expansion or decompression as these terms are used interchangeably is the preferred method of dealing with execution of web applications represented in WAR files.

Figure 2:
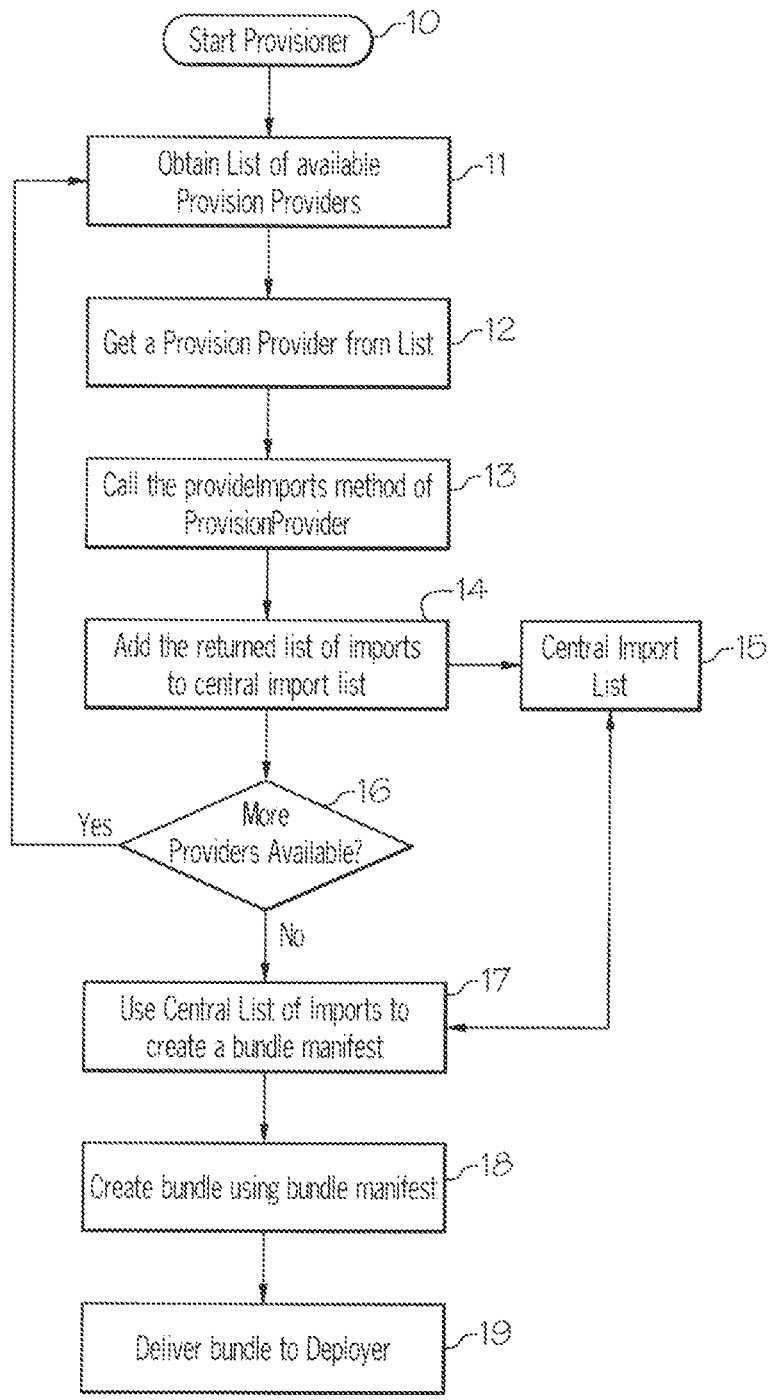
FIG. 2 is a programming flow diagram of a preferred embodiment of the system and method of the invention illustrating an analysis and provisioning mechanism which performs the various steps involved in creating the two components required for deployment and execution of a typical J2EE Web Application in the OSGi environment whenever such an application is found to be invoked for deployment.

Turning now to FIG. 2, a more detailed description of a preferred embodiment of the portions of the invention illustrated in boxes 2 through 9 of FIG. 1 will be given.

In FIG. 2 it is assumed that a WAR file has been detected in a web application as shown in box 2 of FIG. 1 and that the provisioner mechanism is to be run. In box 10 of FIG. 2, the process begins and the provisioner proceeds to obtain a list of registered or available provision sources referred to herein as "provision providers." Provision providers may be other applications or merely locations within the server's resources or within a communications network where a necessary program component or resource may be obtained or accessed for use.

Using the list of registered provision providers, the provisioner iterates and queries or polls the list of providers individually by retrieving the list of registered provision providers from the server's memory in box 11, selecting a provision provider from the list in box 12, and calling the identified provision provider's provide imports method in box 13 in order to get back a list of import statements from the provision provider that identify how to access the provider's resource necessary to fulfill the J2EE dependency that the provision provider is outfitted to provide. This list of import statements is added in box 14 to a master or central import list in box 15 that will eventually be utilized to construct an OSGi execution bundle.

After adding the import statements provided by the selected provision provider to the central import list, the provisioner checks to see if more provision providers are available in its list of registered providers and if so, the process repeats beginning in box 12 as shown. This process is repeated until the list of available providers is exhausted as shown by box 16. Then, in box 17, the provisioner creates a bundle manifest list using the accumulated list of imports from box 15. In box 18, the provisioner creates OSGi execution bundles by assembling the import statements into the OSGi format well-known to programmers in this field, and then delivers the completed bundle as shown in box 19 to the deployer which installs the bundle in the server for execution.

An illustrative example of the functioning of this mechanism as depicted in the Figures will now be given. Let it be assumed that an example WAR file was identified in FIG. 1 and found to contain the following files: /WEB-INF/web.xml, (a WebContainer deployment Descriptor as known in J2EE programming), a /WEB-INF/faces-config.xml (a Java Server Faces (JSF) Descriptor), a /WEB-INF/classes/example/ExampleServlet.class (a Java Servlet Descriptor), a /WEB-INF/classes/example/ExampleFilter.class (a Java Filter Descriptor).

Let it further be assumed that the provisioner of FIG. 2 is currently configured with three provision providers in its list of available or registered provision providers, namely: a Web-Container Provision Provider, a JSP (Java Server Page) Provision Provider and a JSF (Java Server Faces) Provision Provider. Using these three providers, the provisioner iterates through the list as detailed above with reference to FIG. 2, by delivering the decompressed WAR file contents to each Provision Provider in turn. The WebContainer Provision Provider will scan the files and find that a WebContainer deployment Descriptor (web.xml) is present. It then reads the deployment descriptor and discovers that both a Servlet and a Filter have been configured as well, and returns to the provisioner a list object containing the package exports that are required to support the running of a Servlet and a Filter.

The JSP Provision Provider scans the example decompressed WAR file and discovers a JSP within it, whereupon it returns to the provisioner a list object for a list of package exports that will be required to run JSPs.

Then the JSF Provision Provider scans the example decompressed WAR file and discovers a faces-config.xml file and a JSF Servlet defined in the deployment descriptor web.xml. The JSF Provision Provider will return a list object identifying the list of package exports required to run the JSF framework and components defined in the faces.xml file it found.

The provisioner collects all of the identified package exports and assembles them into an OSGi format WebApplication bundle using the information returned by the Provision Providers and the information regarding classes that the example web application itself provides, delivers the information along with the class information to the deployer for installation and startup.

Then the provisioner waits for another WAR file to be detected in a web application headed for deployment and repeats these processes for that file as well.

Within the well-known OSGi framework, when a web application bundle is installed and started, a WebApplication BundleActivator is called by the OSGi framework to set up and register a WebApplicationService. Such registration gives notice to anyone who may be interested in the availability for use of the service performed by the web application. The Web Application Service interface in OSGi is publicly known and has the following format:
"public interface WebApplication {public static final String WEBAPP_SERVICE="com.ibm.wsspi.service.
webapplication.WebApplication"}; {public static final String WEBAPP_CONTEXT="webapp.context"}; {public String getTempDirectory( ); //} which is a path to where the temporary resources such as generated JSP classes can be written to, and public String getRealPath (String path); which is used by the WebContainer bundle to resource any ServletContext calls for Resource Paths. And public Set.getResourcePaths (String Path) and public ClassLoader getClassLoader ( ) which provides access to the ClassLoader that can be used to load classes and resources from the web application itself.}

Using this public interface, when a WebContainer is notified of the registration of the service of the web application, the web application's required resources and classes are bound.

The WebApplication service, when initialized, creates a classloader representing the web application structure. It loads the classes and resources from the standard locations such as the WEB-INF/classes and JAR files as are typically found in a WEB_INF/lib library. A parent classloader for this classloader is the Web Applications bundle classloader itself. This enables resolution of any specified imports that may call for resources located beyond the specific web application's resource boundary when provisioning of the web application has specified such resources in the required imports included in the bundle manifest list generated as detailed above with regard to FIG. 2.

Web Application provisioning as detailed in the operation of the preferred embodiment described above allows for the production of OSGi-formatted execution bundles representing Web Applications to be installed and run within an OSGi environment. Whenever deployment of a J2EE Web Application is requested, the provisioning service of the provisioner of this preferred embodiment is called to produce the requisite Web Application Bundle.

The provisioning service of the invention will call each provision provider from it's list of registered providers in turn, passing each one the following: a classloader representing the web application resources, a file object pointing to the expanded WAR file, and a properties object that will be stored within the web application bundle specifying where to find the required resources.

The provisioner public interface has the following format:
public interface ProvisionProvider {List provideImports (ClassLoader loader, File root, Properties webAppProperties);}

Provision providers may be registered by other OSGi bundles within the OSGi framework that want to indicate to the provisioner what imports they can provide or which are required by a given web application to successfully be run.

Exemplar Provision Providers were alluded to above with respect to an example of the provisioning service's function as carried out by the mechanism and process represented in FIG. 2. Some examples of provision providers and their function would be: A WebContainer Provision Provider that scans the decompressed WAR file looking for any WEB_INF/web.xml files; A JSP Container Provision Provider that scans the decompressed WAR file looking for any resources having JSP extensions; A JSTL (Java Standard Tag Library) Provision Provider that scans the decompressed WAR file looking for any JSTL TLD declarations; A JSF Provision Provider that, in similar fashion to the above providers, scans for any "Faces-config.xml" files; and finally, a JNDI (Java Naming and Directory Interface) Provision Provider that scans for any "resource-ref" elements in the web.xml descriptor. Of course, many other defined resource Provision Providers could be included in this list, so only a few have been detailed herein.

The interface to the provisioner of this preferred embodiment is as follows:
public interface WebAppProvisioner {Bundle createWebAppBundle (String context, String tempDir, String rootDir)}. A second interface is {InputStream createWebAppBundleInputStream (String context, String tempDir, String rootDir)}

These two interfaces give access to two methods of creating the requisite bundles. The first interface method would typically be used when deployment of the web application is to occur at runtime since the bundle produced by it can be installed and started by an application deployer running within an OSGi framework. The second interface method would typically be used in environments that wish to perform a predeployment step and then wait for deployment later. This "input stream" interface method can be used to write out a bundle file that can be installed by the deployer at a later time.

Thus, the JAVA interface, WebAppProvisioner is used by an application deployer who wishes to install and run a web application. The interface describes how the OSGi deployer communicates with the provisioner mechanism of the preferred embodiment herein to produce the OSGi execution bundle that the deployer needs in order to be able to install and run the application. There are two interface methods: createWebAppBundle and createWebAppBundleInputStream.

Both interfaces perform the same function of causing the provisioner to poll the providers, assemble the responses and build the OSGi bundle, and return it in one format or another to the deployer for use. The first interface method will return an OSGi bundle object that can be installed and started immediately while the second interface method returns an InputStream object that the deployer can use to save the bundle contents for installation and execution at a later time.

Although exemplary embodiments of the invention have been disclosed and described in detail above, it will be apparent to those skilled in the art that various changes and modifications can be made which will achieve some of the advantages without departing from the spirit and scope of the invention. It will be obvious to those reasonably skilled in the art that the disclosed systems, methods and programs can be extended to other types of programming languages that may be employed to write web applications and that the systems and methods of the invention may be achieved in software implementations, or hybrid implementations which utilize combinations of hardware logic and software logic to achieve the same results.

What is claimed is:

1. A method of provisioning J2EE-based web applications for deployment in an Open Services Gateway initiative (OSGi) environment comprising steps at a server of:
    detecting a J2EE-based web application bound for deployment and, responsive thereto;
    examining a Web application ARchive (WAR) file contained in the web application for identifying dependencies of the web application on other resources or services; obtaining a list of available provision sources that have resources to fulfill the dependencies;
    querying said list of provision sources for obtaining import statements that identify how to access the resources to fulfill the dependencies; and
    assembling said import statements into an OSGi bundle for deployment and execution in said OSGi environment;
    wherein said querying step further includes steps of:
        delivering to each of said provision sources content of said J2EE-based web application and, at each said provision source;
        scanning said content for any dependencies corresponding to the resources available from said provision source; and
        returning a response to said query that includes a resource corresponding to at least one said dependency.

2. The method of claim 1, wherein
    said step of delivering the content of said J2EE-based web application further includes a preparatory step of:
    expanding the WAR file found in said J2EE-based web application into decompressed, readable format for said scanning step at said provision sources.

3. The method of claim 2, wherein said querying step further includes:
    polling said list of provision sources; and
    supplying each of said provision sources with said content of said J2EE-based web application.

4. The method of claim 1 further comprising a step of:
    delivering said assembled OSGi bundle to a deployer for deployment in said OSGi environment.

5. The method of claim 4, wherein said querying step further includes:
    polling said list of provision sources; and
    supplying each of said provision sources with said content of said J2EE-based web application.

6. The method of claim 1, further comprising:
    compiling said import statements from said provision sources into a central list of import statements; and
    generating an OSGi bundle manifest list from said central list of import statements.

7. The method of claim 6 wherein
    said assembling step includes a step of generating an OSGi bundle using said bundle manifest list.

8. The method of claim 7, further comprising:
    delivering said OSGi bundle to a deployer for deployment.

9. A computer-implemented system of provisioning J2EE-based web applications for deployment in an Open Services Gateway initiative (OSGi) server comprising:
    a processor and a memory, the processor being configured to:
        detect a J2EE-based web application bound for deployment and, responsive thereto;
        examine a Web application ARchive (WAR) file contained in the web application for identifying dependencies of the web application on other resources or services;
        obtain a list of available provision sources that have resources to fulfill the dependencies;
        query said list of provision sources for obtaining import statements that identify how to access the resources to fulfill the dependencies; and
        assemble said import statements into an OSGi bundle for deployment and execution in said OSGi environment;
        wherein said querying step further includes steps of:
            delivering to each of said provision sources content of said J2EE-based web application and, at each said provision source;
            scanning said content for any dependencies corresponding to the resources available from said provision source; and
    returning a response to said query that includes a resource corresponding to at least one said dependency.

10. The system as described in claim 9 wherein the processor is further configured to
    compile a central list of imports from the import statements from members responding to said querying;
    generate an OSGi bundle manifest list using said central list of imports; and
    generate an OSGi bundle using said OSGi bundle manifest list.

11. A program product comprising a recordable storage memory having stored therein program code for provisioning J2EE-based web applications for deployment in an Open Services Gateway initiative (OSGi) environment, the program code which, when executed by a computer hardware system, causes the computer hardware system to perform
    detecting a J2EE-based web application bound for deployment and, responsive thereto;
    examining a Web application ARchive (WAR) file contained in the web application for identifying dependencies of the web application on other resources or services;
    obtaining a list of available provision sources that have resources to fulfill the dependencies;
    querying the members of said list of provision sources for obtaining import statements that identify how to access the resources to fulfill the dependencies; and
    assembling said import statements into an OSGi bundle for deployment and execution in said OSGi environment;

wherein said querying step further includes steps of:
　delivering to each of said provision sources content of said J2EE-based web application and, at each said provision source;
　scanning said content for any dependencies corresponding to the resources available from said provision source; and
　returning a response to said query that includes a resource corresponding to at least one said dependency.

12. The program product of claim 11, wherein the program code further causes the computer hardware system to perform
　delivering to each said provision source the content of said J2EE-based web application;
　calling a provide imports method of each said provision source;
　receiving any imports provided by said provision sources in response to said calling; and
　compiling a central list of imports using said received imports;
　generating an OSGi bundle manifest list using said compiled central list of imports; and
　generating an OSGi bundle using said OSGi bundle manifest list.

13. The program product of claim 12, wherein the program code further causes the computer hardware system to perform
　delivering said OSGi bundle to a deployer for use.

* * * * *